United States Patent [19]
Takahashi et al.

[11] Patent Number: 4,788,434
[45] Date of Patent: Nov. 29, 1988

[54] RADIATION IMAGE RECORDING AND REPRODUCING METHOD

[75] Inventors: Kenji Takahashi; Yuichi Hosoi; Yasushi Kojima, all of Kaisei, Japan

[73] Assignee: Fuji Photo Film Co., Ltd., Japan

[21] Appl. No.: 76,985

[22] Filed: Jul. 20, 1987

Related U.S. Application Data

[63] Continuation of Ser. No. 854,653, Apr. 15, 1986, abandoned, which is a continuation of Ser. No. 664,006, Oct. 23, 1984, abandoned.

[30] Foreign Application Priority Data

Oct. 24, 1983 [JP] Japan ................. 58/198758

[51] Int. Cl.$^4$ .......................... H05B 33/00
[52] U.S. Cl. ................. 250/484.1; 250/327.2
[58] Field of Search .......... 250/484.1, 327.2; 252/301.4 H

[56] References Cited

U.S. PATENT DOCUMENTS 4,535,237  8/1985  Yakahashi et al. ............ 250/327.2
4,535,238  8/1985  Yakahashi et al. ............ 250/327.2

FOREIGN PATENT DOCUMENTS 0021342  1/1981  European Pat. Off. ......... 250/484.1

Primary Examiner—Janice A. Howell
Assistant Examiner—Richard Hanig
Attorney, Agent, or Firm—Gerald J. Ferguson, Jr.

[57] ABSTRACT

A radiation image recording and reproducing method comprising steps of:
  causing a stimulable phosphor to absorb a radiation having passed through an object or having radiated from an object,
  exciting said stimulable phosphor with an electromagnetic wave having a wavelength within the range of 450–900 nm to release the radiation energy stored therein as light emission, and
detecting the emitted light,
in which said stimulable phosphor is a divalent europium activated barium fluorohalide phosphor having the formula (I):

$$BaF(Br_{1-x}I_x):yEu^{2+} \quad (I)$$

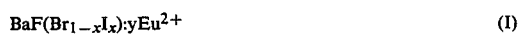

in which x and y are numbers satisfying the conditions of $1\times10^{-3} \leq x < 1.0$ and $0 < y \leq 0.2$, respectively.

7 Claims, 3 Drawing Sheets

RADIATION IMAGE RECORDING AND REPRODUCING METHOD

This application is a continuation of Ser. No. 854,653 filed 4/15/86, now abandoned, which itself was a continuation of application Ser. No. 664,006, filed Oct. 23, 1984, now abandoned.

BACKGROUND OF THE INVENTION

1. Field of the Invention

The present invention relates to a radiation image recording and reproducing method, and more particularly, to a radiation image recording and reproducing method employing a divalent europium activated barium fluorohalide phosphor.

2. Description of Prior Art

For obtaining a radiation image, there has been conventionally utilized radiography employing a combination of a radiographic film having an emulsion layer containing a photosensitive silver salt material and an intensifying screen. As a method replacing the above-mentioned conventional radiography, a radiation image recording and reproducing method employing a stimulable phosphor stated, for instance, in U.S. Pat. No. 4,239,968, has been recently paid much attention. The radiation image recording and reproducing method involves steps of causing the stimulable phosphor to absorb a radiation having passed through an object or having radiated from an object; exciting the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose as compared with the conventional radiography. Accordingly, the radiation image recording and reproducing method is of great value, especially when the method is used for medical diagnosis.

As for a stimulable phosphor employable in the radiation image recording and reproducing method, the above-mentioned U.S. Pat. No. 4,239,968 discloses an alkaline earth metal fluorohalide phosphor having the following formula:

$(Ba_{1-x}M^{II}_x)FX:yA$ in which $M^{II}$ is at least one divalent metal selected from the group consisting of Mg, Ca, Sr, Zn and Cd; X is at least one element selected from the group consisting of Cl, Br and I; A is at least one element selected from the group consisting of Eu, Tb, Ce, Tm, Dy, Pr, Ho, Nd, Yb and Er; and x and y are numbers satisfying the conditions of $0 \leq x \leq 0.6$ and $0 \leq y \leq 0.2$, respectively.

A divalent europium activated barium fluorobromide phosphor ($BaFBr:Eu^{2+}$), which is included in the above-mentioned stimulable phosphor, emits light of high luminance (stimulated emission) and the peak wavelength of the emission is approximately 390 nm, and hence the phosphor is practically very useful. It is also known that the stimulation spectrum of the phosphor has the maximum intensity at approx. 600 nm.

The radiation image recording and reproducing method employing a stimulable phosphor, as described hereinbefore, is advantageous for obtaining a radiation image as a visible image. However, it is desired that the sensitivity of the method to a radiation is further enhanced to decrease the exposure dose for a human body or facilitate the following electrical processing. Especially when the radiation is applied to a human body, the enhancement in the sensitivity is of much value from the viewpoint of adverse effect of the radiation on the human body, even if the level of enhancement is not so remarkable. Accordingly, the stimulable phosphor employed in the radiation image recording and reproducing method is desired to give a stimulated emission of luminance as high as possible.

SUMMARY OF THE INVENTION

The present inventors have found that a divalent europium activated barium fluorohalide phosphor employed in the radiation image recording and reproducing method is remarkably enhanced in the luminance of stimulated emission, when the halogen, being a host component of said phosphor, is composed of such three elements as fluorine, bromine and iodine. Based on this fact, the present invention has been accomplished.

An object of the present invention is to provide a radiation image recording and reproducing method employing a divalent europium activated barium fluorohalide phosphor, which is improved in the sensitivity.

Another object of the present invention is to provide a radiation image recording and reproducing method which is more improved in the sensitivity than the conventional method employing a divalent europium activated barium fluorobromide phosphor, by usng an electromagnetic wave having a long wavelength within the range of 550-850 nm as stimulating rays.

These object are accomplished by the radiation image recording and reproducing method of the present invention comprising the steps of:
  causing a stimulable phosphor to absorb a radiation having passed through an object or having radiated from an object,
  exciting said stimulable phosphor with an electromagnetic wave having a wavelength within the range of 450-900 nm to release the radiation energy stored therein as light emission, and
  detecting the emitted light,
  in which said stimulable phosphor is a divalent europium activated barium fluorohalide phosphor having the formula (I):

$$BaF(Br_{1-x}I_x):yEu^{2+} \qquad (I)$$

in which x and y are numbers satisfying the conditions of $1 \times 10^{-3} \leq x < 1.0$ and $0 < y \leq 0.2$, respectively.

According to the study of the inventors, it has been discovered that the divalent europium activated barium fluorohalide phosphor having the above-mentioned formula (I), namely the phosphor containing three kinds of elements of fluorine, bromine and iodine as halogen which is a host component of the phosphor is prominently enhanced in the luminance of stimulated emission. The radiation image recording and reproducing method employing said stimulable phosphor can be remarkably enhanced in the sensitivity.

It has been further discovered that the stimulation spectrum of the above-mentioned phosphor extends to the long wavelength region as compared with the conventional divalent europium activated barium fluorobromide phosphor, and the luminance of stimulated emission thereof can be enhanced especially when the phosphor is excited with an electromagnetic wave having a wavelength longer than 550 nm. Accordingly, in the radiation image recording and reproducing method employing said phosphor, there can be used as a source of stimulating rays a semiconductor laser which is small and can be driven by a small electric power, and as a result, the apparatus used in the method can be made smaller and more compact than in the conventional method.

DETAILED DESCRIPTION OF THE INVENTION

The radiation image recording and reproducing method of the present invention which is improved in the sensitivity will be described more in detail, with respect to the case of employing the stimulable phosphor in the form of a radiation image storage panel containing thereof by referring to a schematic view shown in FIG. 1.

Figure 1:
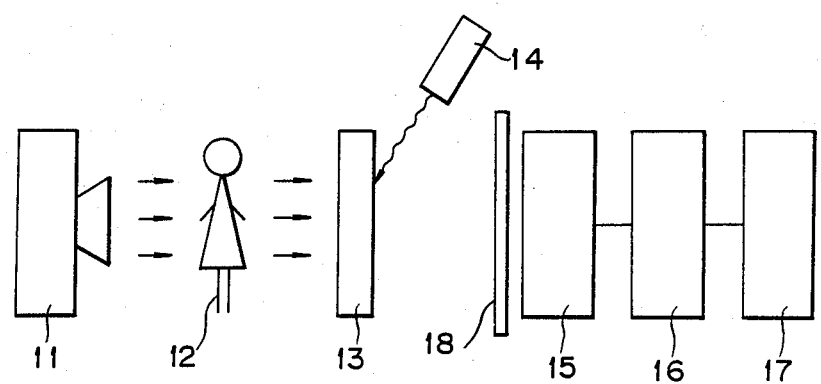
FIG. 1 is a schematic view showing the radiation image recording and reproducing method of the present invention.

In FIG. 1 which shows the total system of the radiation image recording and reproducing method of the present invention: a radiation generating device 11 such as an X-ray source provides a radiation for irradiating an object 12 therewith; a radiation image storage panel 13 containing the divalent europium activated barium fluorohalide stimulable phosphor absorbs and stores energy of the radiation having passed through the object 12; a source of stimulating rays 14 provides an electromagnetic wave (stimulating rays) for releasing the radiation energy stored in the panel 13 as light emission; a photosensor 15 faces the panel 13 for detecting the light emitted by the panel 13 and converting it to electric signals; an image reproducing device 16 is connected with the photosensor sensor 15 to reproduce a radiation image from the electric signals detected by the photosensor 15; a display device 17 is connected with the reproducing device 16 to display the reproduced image in the form of a visible image; and a filter 18 is disposed in front of the photosensor 15 to cut off the stimulating rays reflected by the panel 13 and allow only the light emitted by the panel 13 to pass through.

FIG. 1 illustrates an example of the system according to the method of the invention employed for obtaining a radiation-transmission image of an object. However, in the case that the object 12 itself emits a radiation, it is unnecessary to install the above-mentioned radiation generating device 11. Further, the devices 15 through 17 in the system can be replaced with other appropriate devices which can reproduce a radiation image having the information of the object 12 from the light emitted by the panel 13.

Referring to FIG. 1, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the transmission image of the object 12 is formed on the panel 13.

Thereafter, when the radiation image storage panel 13 is excited with an electromagnetic wave having a wavelength within the range of 450–900 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15 such as a photomultiplier. The electric signals are reproduced as an image by the image reproducing device 16, and the reproduced image is displayed by the display device 17.

For instance, the radiation image stored in the radiation image storage panel 13 is read out by scanning the panel 13 with an electromagnetic wave provided by the source of stimulating rays 14 and detecting the light emitted by the panel 13 through the scanning by means of the photosensor 15 to obtain the electric signals sequentially.

In the radiation image recording and reproducing method of the present invention, there is no specific limitation on the radiation to be applied to an object to obtain a radiation-transmission image, as far as the above-mentioned phosphor gives stimulated emission upon excitation with the above-mentioned electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-mentioned phosphor to become an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 450–900 nm; and light sources providing light having at least one specific wavelength such as an Ar ion laser, an He—Ne laser, a ruby laser, a semiconductor laser, a glass laser, a YAG laser, Kr ion laser, a dye laser and a light emitting diode. Among the above-mentioned sources of stimulating rays, the lasers are preferred because the radiation image storage panel can be excited therewith at a high energy density per unit area. Among the lasers, particularly preferred is an He—Ne laser from the viewpoint of stability and high output power. Also preferred is a semiconductor laser, because its size is small, it can be driven by a small electric power and its output power can be easily stabilized through the direct modulation.

The wavelength of stimulating rays employed in the radiation image recording and reproducing method of the present invention preferably ranges from 550 to 850 nm, and more preferably from 600 to 800 nm, from the viewpoint of the sensitivity as described hereinafter.

There will be described below the stimulable phosphor employable in the method of the present invention having the formula (I):

$$BaF(Br_{1-x}I_x):yEu^{2+} \quad (I)$$

in which x and y are numbers satisfying the conditions of $1\times 10^{-3} \leq x < 1.0$ and $0 < y \leq 0.2$, respectively.

The divalent europium activated barium fluorohalide stimulable phosphor having the formula (I) gives light emission (stimulated emission) of high luminance when excited with an electromagnetic wave having a wavelength within the range of 450–900 nm after exposure to a radiation such as X-rays as compared with the divalent europium activated barium fluorobromide phosphor ($BaFBr:Eu^{2+}$), and the peak wavelength of the emission is approximately 390–405 nm although it varies depending upon x value in the formula (I).

Figure 2:
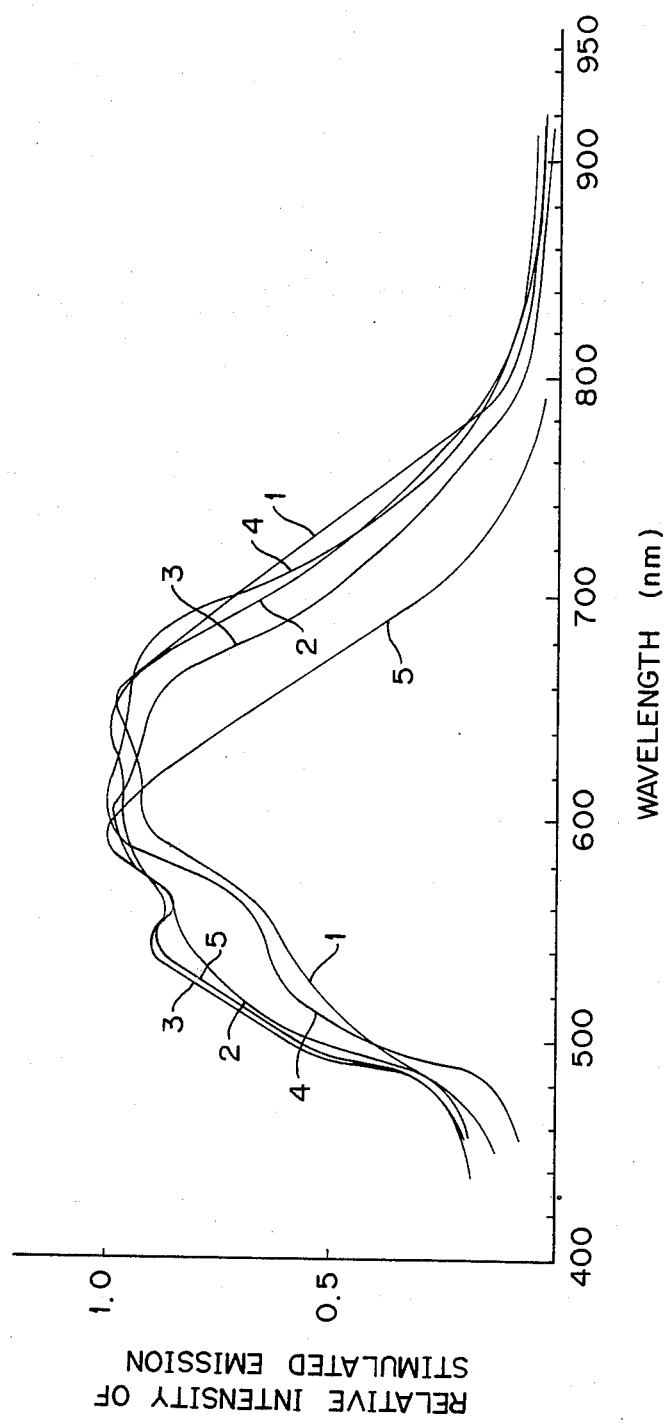
FIG. 2 shows stimulation spectra of divalent europium activated barium fluorohalide phosphors having bromine and iodine in various ratios.

Further, the stimulation spectrum at the peak wavelength of the emission given when exciting the above-mentioned phosphor with an electromagnetic wave whose wavelength is varied after exposure to a radiation such as X-rays extends to the long wavelength region as compared with that of the divalent europium activated barium fluorobromide phosphor, as shown in FIG. 2.

FIG. 2 shows stimulation spectra of the phosphors given upon excitation with stimulating rays after exposure to X-rays at 80 KVp, in which the intensity of stimulated emission at the wavelength of 390 nm is plotted against the wavelength of stimulating rays in the range of 450–900 nm.

1: stimulation spectrum of $BaF(Br_{0.5}I_{0.5}):0.001Eu^{2+}$-phosphor
2: stimulation spectrum of $BaF(Br_{0.75}I_{0.25}):0.001Eu^{2+}$ phosphor
3: stimulation spectrum of $BaF(Br_{0.95}I_{0.05}):0.001Eu^{2+}$ phosphor
4: stimulation spectrum of $BaF(Br_{0.05}I_{0.95}):0.001Eu^{2+}$ phosphor
5: stimulation spectrum of $BaFBr:0.001Eu^{2+}$ phosphor As is evident from FIG. 2, the stimulation spectra of the phosphors which are obtained by replacing iodine for at least a portion of bromine in the conventional divalent europium activated barium fluorobromide phosphor show high intensity in the wavelength region longer than 600 nm. Accordingly, the phosphors employable in the present invention are enhanced in the luminance of stimulated emission especially when excited with stimulating rays having a wavelength longer than that used for the $BaFBr:Eu^{2+}$ phosphor. This means that a semiconductor laser giving a beam of a relatively long wavelength, which has various advantages as mentioned before, can be preferably employed as a source of stimulating rays in the radiation image recording and reproducing method of the invention employing the above-mentioned phosphors. Therefore, when the method of the invention is applied to radiography, there are brought about many advantages in practical use such that the apparatus used therefor can be made compact.

Further, it is possible to shift the peak wavelength of the stimulation spectrum of the phosphor employed in the invention by varying the component ratio between bromine and iodine, the two of the three halogen components of the phosphor (that is, varying x value indicating gram equivalent of iodine in the formula (I) within the above-mentioned range). For instance, as x value is made larger, that is, as the amount of iodine contained in the phosphor increases, the luminance of stimulated emission of the phosphor gradually decreases in the wavelength region shorter than approx. 550 nm, and at the same time, the luminance thereof increases in the wavelength region longer than 600 nm. Accordingly, in the radiation image recording and reproducing method employing said phosphor, variation of the ratio between bromine and iodine (i.e., x value) in the range defined by the above-mentioned formula (I) makes it possible to use stimulating rays having various wavelengths in combination therewith, whereby the sensitivity of the method can be further enhanced.

As for the divalent europium activated barium fluorohalide phosphor having the above-mentioned formula (I), x value is preferably a number satisfying the condition of $0.05 \leq x \leq 0.8$, and more preferably of $0.3 \leq x \leq 0.6$, from the viewpoint of the luminance of stimulated emission upon excitation with an electromagnetic wave of a wavelength within the region of 450–900 nm after exposure to a radiation such as X-rays.

The divalent europium activated barium fluorohalide phosphor is generally employed in the form of a radiation image storage panel in the radiation image recording and reproducing method of the present invention. The panel substantially comprises a support and a phosphor layer provided thereon, which comprises a binder and said stimulable phosphor dispersed therein.

The radiation image storage panel having the above-mentioned structure can be prepared, for instance, in the following manner.

In the first place, the above-described stimulable phosphor particles and a binder are added to an appropriate solvent such as a lower alcohol, chlorinated hydrocarbon, ketone, ester or ether, and then they are mixed well to prepare a coating dispersion containing the stimulable phosphor particles homogeneously dispersed in the binder solution.

Representative examples of the binder include proteins such as gelatin and synthetic polymers such as polyvinyl acetate, nitrocellulose, polyurethane, polyvinyl alcohol, linear polyester and polyalkyl (meth)acrylate.

The ratio between the binder and the stimulable phosphor in the coating dispersion is generally within the range of from 1:8 to 1:40 (binder:phosphor, by weight).

Then the coating dispersion is applied evenly to the surface of a support to form a layer of the coating dispersion. The layer of the coating dispersion is heated slowly to dryness so as to complete the formation of a phosphor layer. The thickness of the phosphor layer is generally within the range of 50–500 μm.

The support material can be selected from those employed for the radiographic intensifying screens in the conventional radiography and those employed in the known radiation image storage panels. Examples of the support material include plastic films such as films of cellulose acetate and polyethylene terephthalate, metal sheet such as aluminum foil, ordinary papers, baryta paper and resin-coated papers.

The surface of the support to receive the phosphor layer may be provided with additional layers such as an adhesive layer, a light-reflecting layer and a light-absorbing layer.

Further, a transparent protective film may be provided on the surface of the phosphor layer not facing the support to physically and chemically protect the phosphor layer. Examples of the material employable for the transparent protective film include cellulose acetate, polymethyl methacrylate, polyethylene terephthalate and polyethylene. The transparent protective film generally has a thickness within the range of approx. 3-20 μm.

The present invention will be illustrated by the following examples, but these examples by no means restrict the invention.

EXAMPLE 1

To a hydrobromic acid solution (HBr; 47 weight %) containing 0.352 g of europium oxide ($Eu_2O_3$) were added 175.4 g. of barium fluoride ($BaF_2$), 166.7 g. of barium bromide ($BaBr_2 \cdot 2H_2O$) and 213.6 g. of barium iodide ($BaI_2 \cdot 2H_2O$), and they were well mixed to give a suspension. The suspension was dried at 130° C. under reduced pressure for 2 hours to prepare a mixture of starting materials for a phosphor.

The mixture of starting materials was fired at 950° C. for 1.5 hours in a nitrogen gas atmosphere containing a small amount of hydrogen gas. Thus fired product was allowed to stand for cooling and pulverized to obtain a powdery divalent europium activated barium fluorohalide phosphor [$BaF(Br_{0.5}I_{0.5}):0.001Eu^{2+}$].

EXAMPLE 2

The procedure of Example 1 was repeated except that the amounts of barium bromide and barium iodide were varied to 250.0 g and 106.8 g., respectively, to obtain a powdery divalent europium activated barium fluorohalide phosphor [$BaF(Br_{0.75}I_{0.25}):0.001Eu^{2+}$].

EXAMPLE 3

The procedure of Example 1 was repeated except that the amounts of barium bromide and barium iodide were varied to 316.6 g. and 21.4 g., respectively, to obtain a powdery divalent europium activated barium fluorohalide phosphor [$BaF(Br_{0.95}I_{0.05}):0.001Eu^{2+}$].

EXAMPLE 4

The procedure of Example 1 was repeated except that the amounts of barium bromide and barium iodide were varied 16.7 g. and 405.8 g., respectively, to obtain a powdery divalent europium activated barium fluorohalide phosphor [$BaF(Br_{0.05}I_{0.95}):0.001Eu^{2+}$].

COMPARISON EXAMPLE 1

The procedure of Example 1 was repeated except that barium iodide was not employed and the amount of barium bromide was varied to 333.3 g., to obtain a powdery divalent europium activated barium fluorobromide phosphor [$BaFBr:0.001Eu^{2+}$].

The phosphors prepared as described above were measured on the stimulation spectra. The results are shown in FIG. 2.

FIG. 2 shows stimulation spectra given when the phosphors are excited with stimulating rays whose wavelength is varied in the range of 450-900 nm after exposure to X-rays at 80 KVp.

1: stimulation spectrum of $BaF(Br_{0.5}I_{0.5}):0.001Eu^{2+}$ phosphor
2: stimulation spectrum of $BaF(Br_{0.75}I_{0.25}):0.001Eu^{2+}$ phosphor
3: stimulation spectrum of $BaF(Br_{0.95}I_{0.05}):0.001Eu^{2+}$ phosphor
4: stimulation spectrum of $BaF(Br_{0.05}I_{0.95}):0.001Eu^{2+}$ phosphor
5: stimulation spectrum of $BaFBr:0.001Eu^{2+}$ phosphor As is evident from FIG. 2, depending on the increase of the amount of iodine contained in the phosphor, the emission intensity of the divalent europium activated barium fluorohalide phosphor decreases in the wavelength region shorter than 550 nm, while increasing in the wavelength region longer than 600 nm. However, the stimulation spectrum of the phosphor does not so change when x value is not less than 0.5.

The phosphors were further measured on the luminance of stimulated emission when excited with an He—Ne laser beam (oscillation wavelength: 632.8 nm) after exposure to X-rays at 80 KVp, to evaluate the sensitivity of the radiation image recording and reproducing method.

Figure 3:
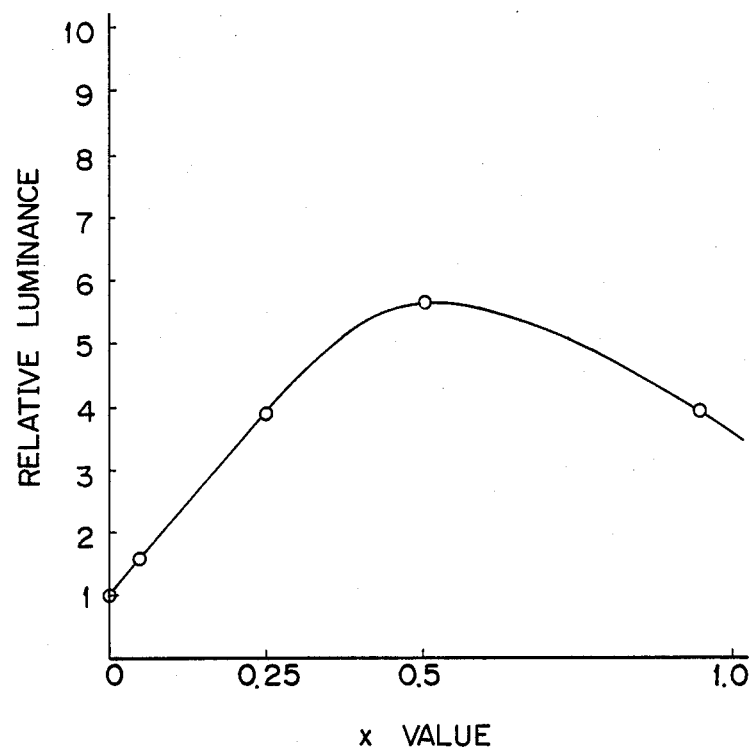
FIG. 3 graphically shows a relationship between x value in the divalent europium activated barium fluorohalide phosphor [$BaF(Br_{1-x}I_x):0.001Eu^{2+}$] and luminance of stimulated emission thereof, in which x value is plotted as abscissa and the luminance is plotted as ordinate.

The results on the evaluation are shown in FIG. 3.

FIG. 3 graphically shows a relationship between x value in the divalent europium activated barium fluorohalide phosphor [$BaF(Br_{1-x}I_x):0.001Eu^{2+}$] and luminance thereof, in which x value is plotted as abscissa and the relative luminance is plotted as ordinate.

As is evident from FIG. 3, the radiation image recording and reproducing method employing the phosphor which contains three elements for halogen by substituting iodine for at least a portion of bromine in the $BaFBr:Eu^{2+}$ phosphor can be prominently enhanced in the sensitivity. Particularly, the sensitivity of the method reaches maximum when x value is approx. 0.5.

We claim:

1. A radiation image recording and reproducing method comprising the steps of:
    causing a stimulable phosphor to absorb a radiation having passed through an object or having radiated from an object,
    exciting said stimulable phosphor with an electromagnetic wave having a wavelength within the range of 450-900 nm to release the radiation energy stored therein as light emission, and
    detecting the emitted light,
    in which said stimulable phosphor is a divalent europium activated barium fluorohalide phosphor having the formula (I):

$$BaF(Br_{1-x}I_x):yEu^{2+} \quad (I)$$

in which x and y are numbers satisfying the conditions of $0.05 \leq x \leq 0.8$ and $0 < y \leq 0.2$, respectively.

2. The radiation image recording and reproducing method as claimed in claim 1, in which said electromagnetic wave has a wavelength within the range of 550-850 nm.

3. The radiation image recording and reproducing method as claimed in claim 2, in which said electromagnetic wave has a wavelength within the range of 600-800 nm.

4. The radiation image recording and reproducing method as claimed in claim 1, in which said electromagnetic wave is a laser beam.

5. The radiation image recording and reproducing method as claimed in claim 4, in which said electromagnetic wave is a He—Ne laser beam.

6. The radiation image recording and reproducing method as claimed in claim 4, in which said laser beam is a semiconductor laser beam.

7. The radiation image recording and reproducing method as claimed in any one of claims 1 through 6, in which said stimulable phosphor is employed in the form of a radiation image storage panel which comprises a support and a stimulable phosphor layer provided thereon.

* * * * *